(12) United States Patent
Elensi et al.

(10) Patent No.: US 9,491,337 B2
(45) Date of Patent: Nov. 8, 2016

(54) ARRANGEMENT FOR A MONITORING CAMERA DEVICE

(71) Applicant: AXIS AB, Lund (SE)

(72) Inventors: Mikael Elensi, Malmö (SE); Marcus Lundberg, Limhamn (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 14/870,830

(22) Filed: Sep. 30, 2015

(65) Prior Publication Data

US 2016/0112608 A1    Apr. 21, 2016

(30) Foreign Application Priority Data

Oct. 15, 2014 (EP) ..................... 14188950

(51) Int. Cl.
*H04N 5/225* (2006.01)
*H04N 5/232* (2006.01)
*G08B 13/196* (2006.01)

(52) U.S. Cl.
CPC ........ *H04N 5/2252* (2013.01); *G08B 13/1963* (2013.01); *G08B 13/19619* (2013.01); *H04N 5/23206* (2013.01)

(58) Field of Classification Search
CPC ....................... H04N 5/2252; G08B 13/19619
USPC ........................................................ 348/373
See application file for complete search history.

(56) References Cited

U.S. PATENT DOCUMENTS

| 3,916,097 | A | 10/1975 | Imai |
| 3,993,866 | A | 11/1976 | Pearl et al. |
| 4,833,534 | A | 5/1989 | Paff et al. |
| 5,765,043 | A | 6/1998 | Tyler |
| 6,049,432 | A * | 4/2000 | Machida ............... G02B 7/10 359/699 |
| 6,354,749 | B1 | 3/2002 | Pfaffenberger, II |
| 6,525,766 | B1 | 2/2003 | Ikoma et al. |
| 7,460,319 | B2 | 12/2008 | Aiba et al. |
| 8,137,009 | B2 | 3/2012 | Cirker |
| 2004/0156181 | A1 * | 8/2004 | Nomura ............... G02B 7/28 362/18 |
| 2005/0018074 | A1 | 1/2005 | Nakamoto et al. |
| 2009/0207505 | A1 * | 8/2009 | Nomura ............... G02B 7/102 359/738 |
| 2014/0248045 | A1 | 9/2014 | Wada et al. |

FOREIGN PATENT DOCUMENTS

| EP | 2657762 A1 | 10/2013 |
| WO | 2008023564 A1 | 2/2008 |

* cited by examiner

*Primary Examiner* — Usman Khan
(74) *Attorney, Agent, or Firm* — Volpe and Koenig, P.C.

(57) ABSTRACT

An arrangement for a monitoring camera device having a camera head being movable within a movement range ($MR_1$, $MR_2$) is provided. The arrangement comprises an enclosure for covering the interior of the monitoring camera device and having an opening for the camera head providing a free line of sight for an arbitrary camera head position within the movement range ($MR_1$, $MR_2$), a shield movably arranged relative the enclosure for masking parts of the opening not being used for providing the free line of sight for the arbitrary camera head position, the shield comprising a first and a second shield portion mutually movably arranged, wherein the shield is maneuverable between a compressed state and an extended state by movement of the first shield portion relative to the second shield portion. A monitoring camera device comprising the arrangement is further provided.

14 Claims, 3 Drawing Sheets

ARRANGEMENT FOR A MONITORING CAMERA DEVICE

CROSS REFERENCE TO RELATED APPLICATION

This application claims the benefit of European Patent Application No 14188950.1 filed on Oct. 15, 2014, which is incorporated by reference as if fully set forth.

FIELD OF THE INVENTION

The invention relates to an arrangement for a monitoring camera device and a monitoring camera device comprising such an arrangement.

BACKGROUND OF THE INVENTION

A monitoring camera device such as a network camera device may be used in many different situations, both indoors and outdoors, to monitor a scene. The monitoring camera device often comprises a camera head where the camera head is movable within a movement range for adjustment during the installation of the monitoring camera device. This simplifies the installation and alignment of the camera head such that a desirable view of the scene is achieved by the monitoring camera device. The camera head may additionally or alternatively be movable within a movement range during operation of the monitoring camera. This is advantageous as the line of sight for the camera head of the monitoring camera device may be adjusted during monitoring and thereby the monitored view of the scene may be changed. The monitoring camera device may further comprise a plurality of movable camera heads such that a larger extent of a scene may be monitored or that different portions of the scene may be monitored by each of the camera heads.

In many situations it is desirable to increase the robustness and durability of the monitoring camera device by protecting the interior of the monitoring camera device by an enclosure. To design the enclosure is, however, a complicated task as the enclosure should not block or disturb the view of the monitoring camera device. The enclosure should further not hinder the movement capability of the camera head(s) of the monitoring camera device.

The enclosure may further be arranged to at least partly block view into the monitoring camera device. This may for example be desirable in a surveillance situation where it is advantageous to prevent or at least to render it more difficult for a person viewing the monitoring camera device to detect the direction at which a camera head is aimed. Problems associated with that a person in a scene, who detects where a visible camera head is directed, may based on this awareness move out of the view of the visible camera head, may thereby be prevented or at least alleviated. Discomfort which may result from that a person in a scene feels monitored by a visible camera head may further be mitigated. A more effective and discrete monitoring camera may therefore be obtained by blocking view into the interior of the monitoring camera device.

To this end, U.S. Pat. No. 3,993,866 A discloses a housing enclosing a camera. The housing further comprises a transparent cover which is coated such that the camera is substantially invisible from the outside of the housing.

Alternatively, U.S. Pat. No. 6,354,749 B1 describes a housing for a surveillance camera having an upper housing which houses a pan-and-tilt mechanism. The camera is carried by the pan-and-tilt mechanism, and extends into a lower, transparent housing. An inner liner is provided within the lower housing and covers the camera in order to protect the camera. The inner liner covers the camera, except that a slot allows the camera lens to capture images through the lower housing. A shield is fixed to the camera to move with the camera, covering the slot in the inner liner, the shield defining one opening for the camera lens. The inner liner and the shield are dark in color to prevent visual location of the camera lens.

Moreover, U.S. Pat. No. 5,765,043 A discloses an enclosure for housing and protecting a device adapted to be continuously aimed at an external target object. The enclosure includes inner and outer windowed portions which are movable relative to one another in response to movements of the device. The outer window is elongated and oriented around the tilt axis of the device to provide a line of sight to the target object at all times in response to tilting rotation of the device. The inner window is smaller and extends transversely of the outer window. Because the outer enclosure portion or dome overlies the inner enclosure portion or dome it blocks the line of sight to the target object except when the inner window is in registry with the outer window. When this occurs a relatively small opening affords a clear line of sight.

US 2005/018074 A1, furthermore discloses an active camera apparatus and a robot apparatus in which the camera and the camera actuator can be protected from the external environment.

This is achieved by providing an outer body of ball shell type has an opening. A camera is located in the outer body and receives an image from outside of the outer body through the opening. A camera support unit is located in the outer body and rotationally supports the camera along a first axis and a second axis mutually crossed at a center of the outer body.

There is, however, a need to further improve protection and/or blocking view of the interior of a monitoring camera device and in particular when the monitoring camera device comprises a movable camera head.

SUMMARY OF THE INVENTION

It is an object of the present invention to provide an improved covering such that improved protection and/or masking of a monitoring camera device is provided. According to a first aspect of the invention, this and other objects that will be evident from the following description are achieved by providing an arrangement for a monitoring camera having a camera head being movable within a movement range. The arrangement comprises an enclosure for covering the interior of the monitoring camera device and having an opening for the camera head providing a free line of sight for an arbitrary camera head position within the movement range, a shield movably arranged relative the enclosure for masking parts of the opening not being used for providing the free line of sight for the arbitrary camera head position, the shield comprising a first and a second shield portion mutually movably arranged, wherein the shield is maneuverable between a compressed state and an extended state by movement of the first shield portion relative to the second shield portion.

By the shield being movably arranged relative to the enclosure an efficient covering of the interior of the monitoring camera device is achieved while a free line of sight for the camera head is provided. A more robust and durable monitoring camera device may thereby be obtained.

The shield and the enclosure may further prevent view into the camera. This allows for the use of a transparent cover such as a dome window. An improved optical quality of the monitoring camera device is therefore obtained as, for example, more light from a scene may reach the camera head of the monitoring camera without being scattered, refracted and/or reflected by the cover as would be the case for a cover being reflective or translucent. A clearer image of the scene may further be obtained.

The opening of the enclosure may be larger than the extent of the camera head which provides an unperturbed movement of the camera head within the movement range.

A more versatile enclosure is provided as camera heads having differing diameters may be used by the same enclosure. In other words, the opening provides the possibility to use camera heads having different diameters as long as the diameters are smaller than a smallest width of the openings. Simplified installation and a more efficient monitoring of a scene may thereby be provided by a monitoring camera device comprising the arrangement.

Another advantage is that a compact arrangement is provided by the first and a second shield portions being mutually movably arranged such that the shield is maneuverable between a compressed state and an extended state. A simple arrangement for covering the interior of the monitoring camera device is also obtained. The arrangement thereby protects the interior of the monitoring camera device from external forces such as a blow which may damage the monitoring camera device.

The interior of the monitoring camera device may further be efficiently blocked from view from the outside of the monitoring camera device.

Problems associated with the movable shield coming in contact with or in other ways interfering with components such as a base for the camera head and/or control electronics for the monitoring camera device are further mitigated.

The first shield portion of the shield may comprise an aperture being moveable in a range corresponding to the movement range of the camera head and defined by a first and a second end position by movement of the shield in order to align the aperture with the free line of sight for the arbitrary camera head position.

An advantage is that the aperture may have an extension which corresponds to the extension of the camera head. In other words, an efficient masking is provided in that the contour of the mask may closely follow the periphery of the camera head. A formation of a gap adjacent to the camera head may therefore be avoided and an improved masking of the opening, and thereby a denser covering of the interior of the monitoring camera device is obtained. The interior of the monitoring camera device is better protected by the shield. A more efficient blocking of view into the monitoring camera device may further be obtained by the shield.

The shield may be maneuverable from the compressed state to or towards the extended state in response to an alignment of the aperture of the first shield portion of the shield with the free line of sight for the arbitrary camera head position.

The shield may thereby follow the movement of the camera head such that an effective covering of the interior of the monitoring camera device is obtained. The interior of the monitoring camera device may further be efficiently blocked from view from the outside of the monitoring camera device. By being maneuverable from the compressed state to or towards the extended state a simple and compact arrangement is provided which covers the interior of the monitoring camera device for an arbitrary camera head position within the movement range of the camera head. The allowed movement of the camera head further provides a more efficient and flexible monitoring of a scene by the monitoring camera device.

The shield may be maneuverable to the extended state during movement of the aperture from the first end position to the second end position.

This allows for a compact design of the shield, while preventing that a gap is formed in the covering of the interior of the monitoring camera device. Problems associated with contact with or interference between the shield and components arranged within the monitoring camera device may thus be further mitigated. This reduces constraints on the design of the interior of the monitoring camera and components within the monitoring camera may for example be placed further away from the center of the monitoring camera device. The prevention of a gap being formed in the covering of the interior of the monitoring camera device may further prevent view into the interior of the monitoring camera device.

The arrangement may further comprise a spring member arranged to cause a relative movement between the first and second shield portion during movement of the aperture from the first end position towards the second end position such that the shield assumes the extended state.

A more compact shield may thereby be achieved. The formation of a gap between the enclosure and the shield is prevented. In other words, the relative movement between the first and second shield portion, caused by the spring member, makes the second shield portion extend beyond the first shield portion such that the interior of the monitoring camera device is covered by the shield. The interior of the monitoring camera device may thereby be protected from external forces which may originate from a blow. The opening of the enclosure may further be efficiently masked by the arrangement such that the interior may be blocked from view from the outside of the monitoring camera device.

The spring member may be arranged to cause the relative movement between the first and second shield portion during an initial range part of the movement of the aperture from the first end position to the second end position such that the extended state of the shield is established before the aperture reaches the second end position.

This is advantageous as the formation of a gap between the enclosure and the shield is further mitigated.

The range defined by the first and the second end position may correspond to a movement range of the camera head between 0 and 90 degrees, preferably between 15 and 75 degrees.

The shield may be pivotably mounted in the enclosure which enables the shield to move relative the enclosure.

The shield and/or the enclosure may be non-transparent which prevents a view of the interior of the monitoring camera device. This may render it more difficult for a person viewing the monitoring camera device to detect where a camera head is aimed. The risk that a person viewing the camera may be disturbed by a feeling of being watched by the monitoring camera device is further reduced. Hence, a more discreet monitoring camera device is provided.

The first and the second shield portions may overlap in the compressed state of the shield.

A more compact shield is thereby obtained which requires less space for movement within the interior of the monitoring camera device. The overlap further provides a more robust and durable shield.

The second shield portion may comprise a cut out arranged such that the shield in its compressed state forms a continuous outer envelope surface and that a common aperture is defined by the cut out and the aperture of the first shield portion of the shield. The shield may thereby be made more compact as the overlap between the first and the second shield portions may be increased in the compressed state.

The first and the second shield portions may be mutually movably arranged by means of a joint providing a pivotable connection between the first and second shield portions. An efficient relative movement between the first and the second shield portions may thereby be achieved.

The joint may comprise a pivot stop defining a maximum pivot angle of the pivotable connection between the first and second shield portions corresponding to the expanded state of the shield. A gap between the first and the second shield may thereby be prevented.

The arrangement may further comprise a plurality of camera heads each being movable within an associated movement range, wherein the enclosure further comprises openings for each of the plurality of camera heads such that free lines of sight are provided for each arbitrary camera head position of the associated camera heads within the movement range for each of the camera heads, and wherein the first shield portion of the shield comprises a plurality of apertures, each aperture being alignable with the free line of sight for each arbitrary camera head position of the associated camera heads.

A larger extent of a scene may be thereby be monitored and different portions of the scene may be monitored by each of the camera heads. A multiple of views of a scene may be monitored by the monitoring camera device such that a more detailed view of a scene may be obtained from a scene.

According to a second aspect of the invention, a monitoring camera device comprising the arrangement described above is provided.

The function and benefits of the monitoring camera device are described above in relation to the arrangement. The above mentioned features, when applicable, apply to this second aspect as well.

It is noted that the invention relates to all possible combinations of features recited in the claims.

BRIEF DESCRIPTION OF THE DRAWINGS

These and other aspects of the present invention will now be described in more detail, with reference to the appended drawings showing embodiments of the invention.

As illustrated in the figures, the sizes of layers and regions are exaggerated for illustrative purposes and, thus, are provided to illustrate the general structures of embodiments of the present invention. Like reference numerals refer to like elements throughout.

DETAILED DESCRIPTION OF THE PREFERRED EMBODIMENTS

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and to fully convey the scope of the invention to the skilled person.

Figure 1:
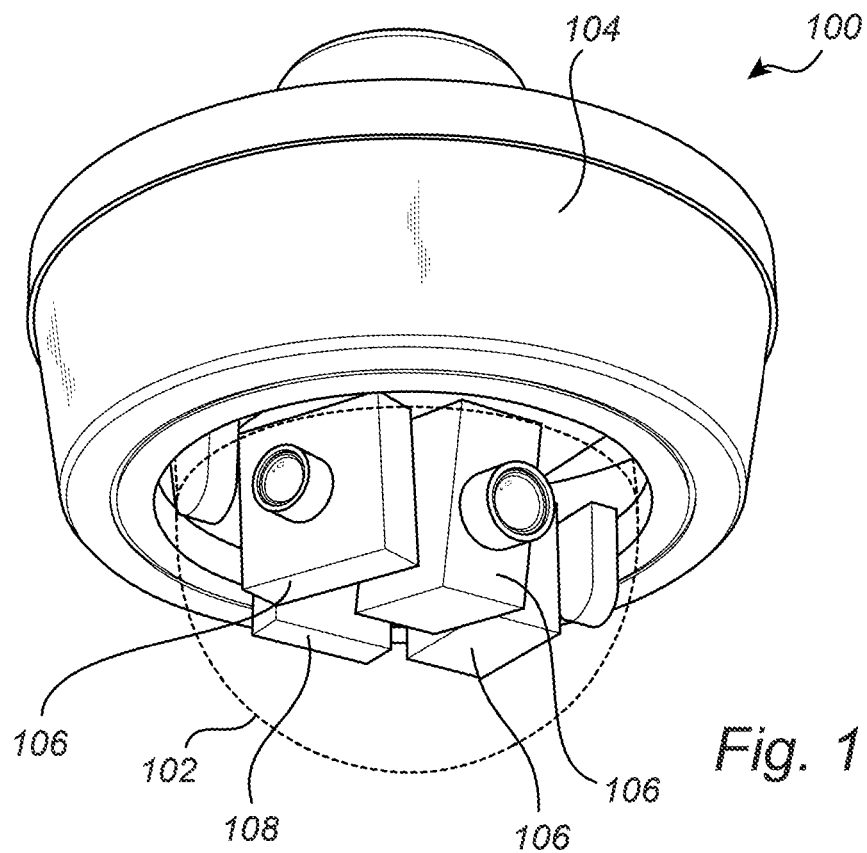
FIG. 1 illustrates a monitoring camera device.

FIG. 1 shows a monitoring camera device 100 comprising a dome window 102 (indicated with dotted lines), a mounting base 104 and a plurality of camera heads 106.

The monitoring camera device 100 according to the embodiment shown in FIG. 1 is for reasons of clarity depicted without the inventive arrangement comprising an enclosure and a shield. The arrangement will however be described in detail below with reference to FIGS. 2 and 3a-3b.

According to the embodiment shown in FIG. 1, the monitoring camera device 100 is a network camera device comprising three camera heads 106. The field of views for the camera heads 106 may be spatially separated or overlap. The plurality of camera heads 106 may thereby increase the field of view for the monitoring camera device 100 compared to the use of a single camera head. The camera heads 106 are arranged to capture images or image streams from a scene. The camera heads 106 may be arranged to provide images or image streams which may be presented separately or be stitched together. The camera heads 106 are each movable within a movement range. The movement range of the camera heads 106 set the extent, i.e. the angular range, through which the camera heads may move. The movement range of the different cameras may differ in extent but may also be the same. The camera heads 106 may move independently or in a unison manner. The movements of the camera heads 106 may occur during installation or adjustment of the monitoring camera device 100, to for example adjust the scene(s) which is/are monitored by the monitoring camera device 100. The camera heads 106 may further move during operation of the monitoring camera device 100 such that an object within a scene may for example be followed.

Here, the mounting base 104 has a circular cross-section and may be rotatable about an axis which is substantially perpendicular to a circular cross-section of the mounting base 104 of the monitoring camera device 100. A more flexible mounting of the mounting base 104 is thereby obtained. The mounting base 104 may further be arranged to rotate the monitoring camera device 100 such that the field of view of the monitoring camera device 100 may be varied.

According to other embodiments the mounting base 104 may be fixed relative the monitoring camera device 100.

The dome window 102 is normally made of a transparent material, such as a transparent plastic material. To protect the monitoring camera device, and in particular the camera heads 106 of the monitoring camera device 100 against outside forces, the dome window 102 may be made of a material strong enough to be able to withstand a certain amount of blows and hits.

The transparency of the dome window, however, allows the interior of the monitoring camera device 100 to be visible from the outside of the monitoring camera device. A person viewing the monitoring camera device 100 may thereby detect where the visible camera heads 106 are aimed and from that gain information of whether a location in a scene is presently monitored or not by the monitoring camera device 100. Hence, the efficiency of the monitoring camera device 100 in, for example, a surveillance application is reduced as a person may move out of the view of one or more of the camera heads 106 to avoid being monitored by the monitoring camera device 100.

The visibility of the interior of the monitoring camera device 100 to a person viewing the monitoring camera device 100 may further result in that the person may feel being monitored by a visible camera head. This may cause discomfort for the person.

Control electronics 108 to for example steer the camera heads 106 may further be viewed from outside the monitoring camera device which may cause attention. The control electronics 108 may further comprise a light emitting element such as a light emitting diode which may further reduce the discreetness of the monitoring camera device 100.

Figure 2:
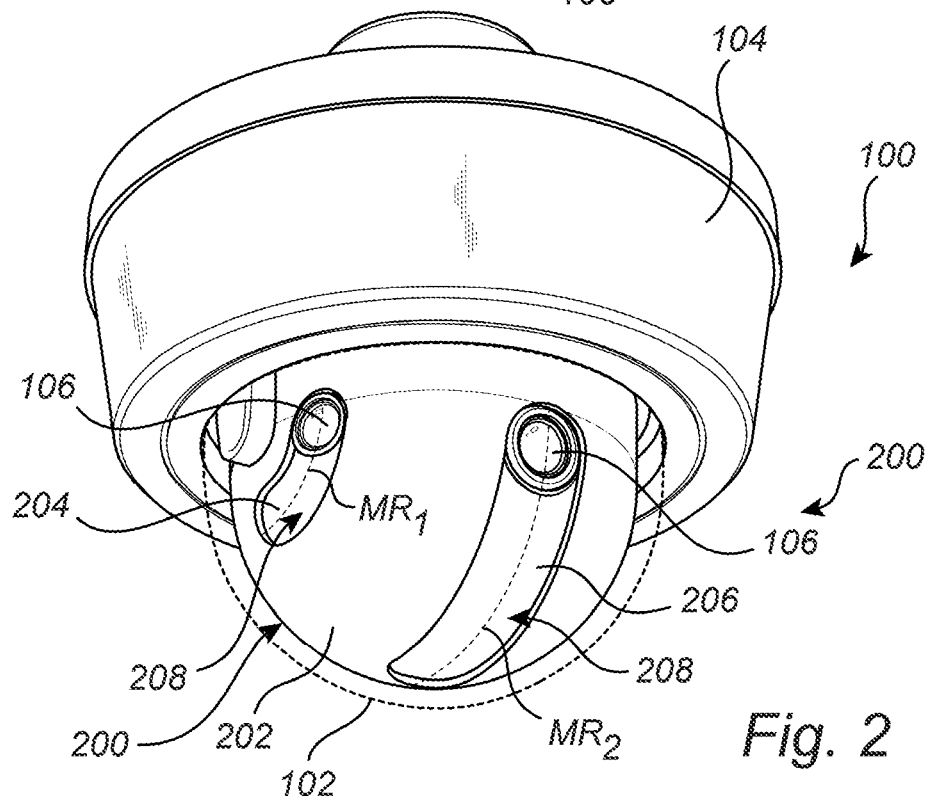
FIG. 2 illustrates the monitoring camera device of FIG. 1 further comprising an arrangement for the monitoring camera device according to one embodiment of the present invention.

FIG. 2 illustrates the monitoring camera 100 according to FIG. 1 further comprising an arrangement 200. The arrangement 200 comprises an enclosure 202 for covering the interior of the monitoring camera device 100. The enclosure 202 has openings 204, 206 for the camera heads 106 such that a free line of sight for an arbitrary camera head position is provided within the movement ranges $MR_1$ and $MR_2$ of the camera heads 106. The enclosure 202 may be formed by two parts assembled such that a joint is formed between the two parts extending in parallel with the movement range $MR_2$. A simplified manufacturing of the enclosure 202 may thereby be achieved.

The arrangement 200 further comprises a shield 208 which is movably arranged relative the enclosure 202 such that parts of the openings 204, 206 not being used for providing the free line of sight for the arbitrary camera head positions are masked. The arrangement 200 thereby protects the interior of the monitoring camera device 100 such that a more robust and durable monitoring camera device 100 is provided.

According to this embodiment the enclosure 202 and the shield 208 are non-transparent such that viewing of the interior of the monitoring camera device 100 is prevented. By blocking view into the interior of the monitoring camera device 100 determination of where the camera heads 106 are aimed is prevented or at least rendered more difficult. A more effective and discrete monitoring camera device 100 is therefore obtained as discussed above.

The camera heads 106 according to this arrangement further comprise anti-reflective coatings on their outer protruding ends such that a determination of their line of sight is made more difficult. The enclosure 202 and the shield 208 are preferably of the same material and/or have the same visual appearance. The surface structure and color of the enclosure 202 and the shield 208 may be the same. The camera heads 106 may have the same visual appearance as the enclosure 202 and the shield 208.

The enclosure 202 and/or the shield 208 may further be of a plastic material, such as a polycarbonate/acrylonitrile-butadiene-styrene (PC/ABS) thermoplastic blend. Metallic materials may also be used.

Figure 3A:
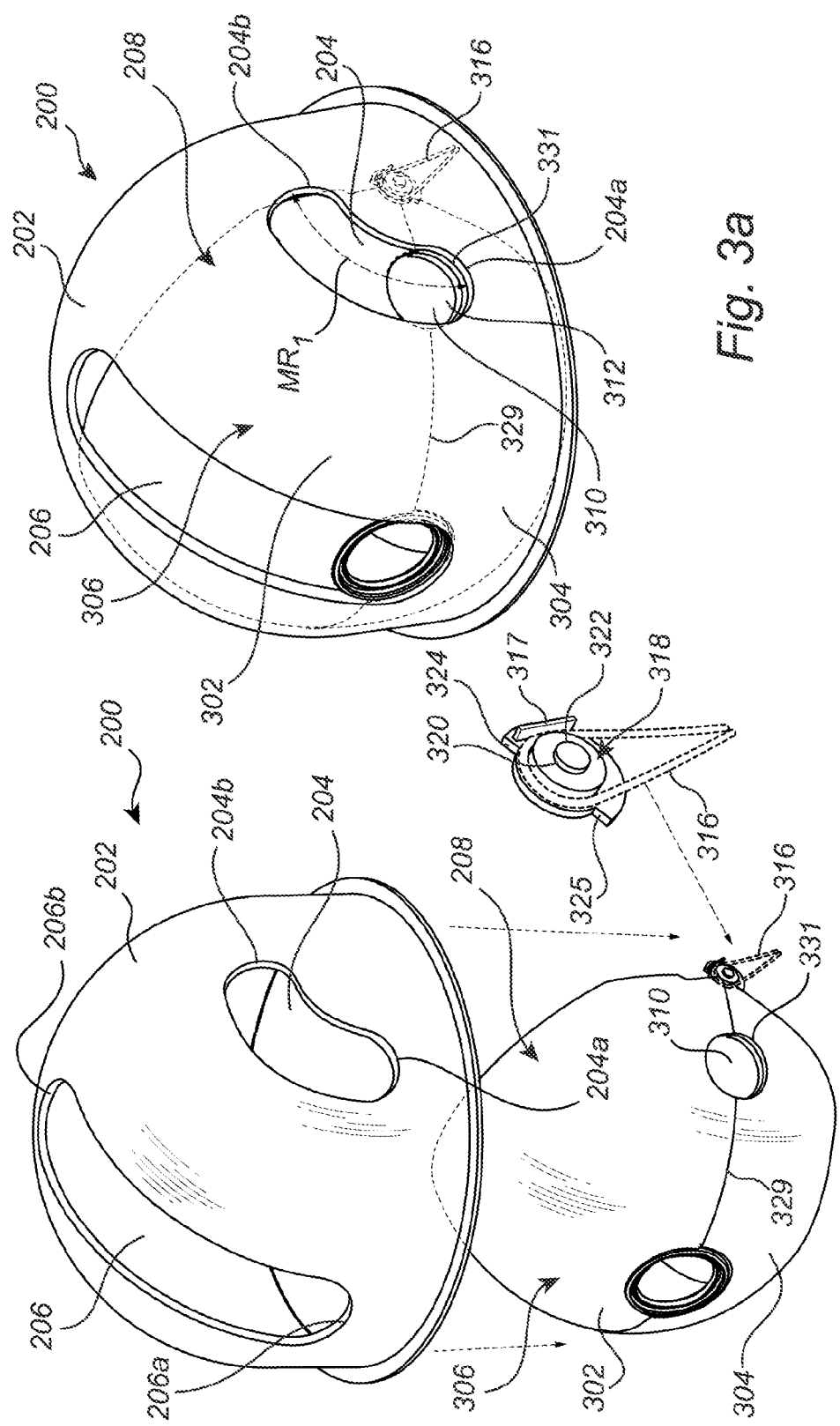
FIGS. 3a and 3b illustrate exploded and assembled perspective side views, respectively, of the arrangement of FIG. 2 according to one embodiment of the present invention.
Figure 3B:
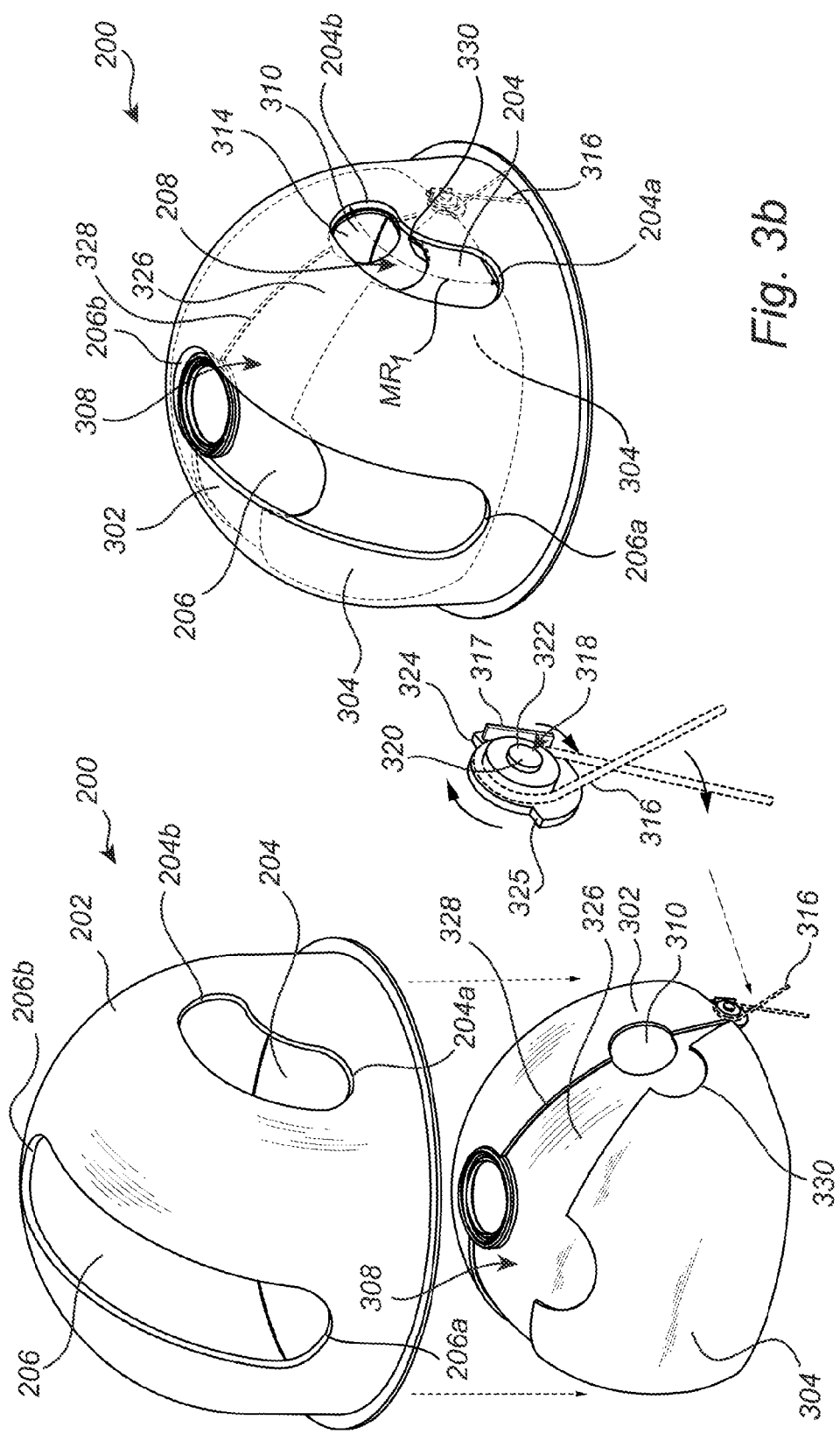

FIGS. 3a and 3b illustrates perspective side views of the arrangement 200 for the monitoring camera device 100 where the opening 204 of the enclosure 202 is shown. For clarity the arrangement 200 is shown both in partly exploded and assembled views. The opening 204 has a lower edge 204a and an upper edge 204b. The lower edge 206a and the upper edge 206b of the second opening 206 are also, for clarity, indicated in the figures.

The shield 208 further comprises a first 302 and a second 304 shield portion. The first 302 and the second 304 shield portion are mutually movably arranged such that the shield 208 is maneuverable between a compressed state 306, see FIG. 3a, and an extended state 308, see FIG. 3b, by movement of the first shield portion 302 relative to the second shield portion 304. According to this embodiment the first 302 and the second 304 shield portions overlap such that the second shield portion 304 is, at least in the compressed state, arranged on the exterior of the first shield portion 302.

The first shield portion 302 of the shield 208 comprises an aperture 310 which is moveable in a range corresponding to the movement range $MR_1$ of the camera head. The range is defined by a first end position 312 and a second end position 314, which are illustrated in FIGS. 3a and 3b, respectively. By the aperture 310 following the movement of the shield 208, which in turn follows the movement of a camera head (shown only in FIG. 2), a free line of sight for the arbitrary camera head position is achieved. An efficient masking of the opening 204 and thus covering of the interior of the monitoring camera device 100 is thereby provided as the contour of the mask, which is set by the periphery of the aperture 310, may closely follow the periphery of the camera head 106. A formation of a gap adjacent to the camera head is therefore avoided and a closer covering of the interior of the monitoring camera device 100 is obtained. The enclosure 202 and the shield 208, i.e. the first 302 and the second 304 shield portions, are in this embodiment non-transparent such that a more efficient blocking of view into the monitoring camera device 100 is obtained by the arrangement 200.

FIGS. 3a and 3b further illustrate how the shield 208 is maneuverable from the compressed state 306 to the extended state 308 as the aperture moves from the first end position 312 to the second end position 314. For the sake of completeness it should be mentioned that the shield 208 moves from the compressed state 306 to or towards the extended state as the aperture 310 is positioned at an arbitrary position between the first end position 312 and the second end position 314 as a response to the movement of the shield 208. An alignment of the aperture 310 of the first shield portion 302 of the shield 208 with the free line of sight for an arbitrary camera head position may thereby be provided.

By being maneuverable from the compressed state 306 to or towards the extended state 308 a simple and compact arrangement 200 is provided which covers the interior of the monitoring camera device 100 for an arbitrary camera head position within its movement range. The uninterrupted movement of the aperture 310 facilitates a smooth movement of the camera head 106 such that efficient and flexible monitoring of a scene is provided by the monitoring camera device 100 while the interior of the monitoring camera device 100 is covered.

The shield 208 is further maneuverable to the extended state 308 during movement of the aperture 310 from the first end position 312 to the second end position 314. The associated relative movement of the first 302 and the second 304 shield portions thereby prevents that a gap is formed in shield 208 such that an efficient covering of a monitoring camera device may be achieved. A compact design of the shield 208 is further provided.

A spring member 316 causes the relative movement between the first 302 and second 304 shield portions such that the shield 208 assumes the extended state 308 during movement of the aperture 310. In other words, the extended state 308 is reached when the aperture 310 moves from the first end position 312 towards the second end position 314. Such a movement may be achieved by the movement of a camera head 106 of a monitoring camera device 100 comprising the arrangement 200. In other words, the relative movement between the first 302 and second 304 shield portion, caused by the spring member 316, makes the second shield portion 304 extend beyond the first shield portion 302 such that the interior of a monitoring camera device is covered by the shield 208. The interior of the monitoring camera device 100 may thereby also be efficiently covered such that the interior may be blocked from view from the outside of the monitoring camera device 100.

The spring member 316 and the arrangement thereof is shown in more detail in detached enlargements in FIGS. 3a and 3b. The spring member 316 is in this embodiment arranged on the enclosure 202, but may in other embodiments be arranged on the shield 208.

An abutment 317 is arranged on the second shield portion 304. The abutment 317 rests against a movable leg of the spring member 316 such that the second shield portion is movable relative the enclosure 202 against the spring action of the spring member 316.

The spring member 316 is arranged to control the relative movement between the first 302 and second 304 shield portions during movement of the aperture 310. A more compact shield 208 may thereby be provided as the second shield portion 304 may be made smaller while a gap formation between the shield 208 and the enclosure 202 is prevented at for instance the lower ends 204a and 206a of the openings 204 and 206, respectively. The relative movement between the first 302 and second 304 shield portions, controlled by the spring member 316, during movement of the aperture 310 provides that the extended state 308 of the shield 208 may be established before the aperture 310 reaches the second end position 314, and during movement from the second end position 314 to the first end position 312, that the compressed state 306 may be established when the aperture 310 reaches the first end position 312. This prevents the formation of uncovered gaps in the shield 208. The overlapping enclosure 202 and the shield 208 of the arrangement 200 thereby provide a covering of the interior of the monitoring camera device 100.

Still referring to FIGS. 3a and 3b, the range defined by the first 312 and the second 314 end position corresponds, according to this embodiment, to a movement range $MR_1$ of a camera head between 15 and 75 degrees. The aperture 310 is further moveable in the range $MR_1$ corresponding to the movement range of a camera head such that a free line of sight is provided for an arbitrary camera head position within the range $MR_1$. This is advantageous in, for example, a situation where a monitoring camera device 100 comprising the arrangement 200 is arranged in a ceiling of a room. This movement range may prevent that the ceiling itself is monitored by the monitoring camera device 100. The field of view of the camera head 106 may however be large enough such that a 0 to 90 degree view of the room is provided.

According to other embodiments the range defined by the first 312 and the second 314 end positions correspond to a movement range of 0 to 90 degrees. By covering the range 0 to 90 degree the camera head of a monitoring camera device 100 may monitor an angular space of at least 90 degrees.

It should be noted that the angular space covered by the field of view of a camera head may further increase the monitoring range of the monitoring camera device. As an example, a camera head having a field of view of for instance 60° may allow for monitoring of an angular space defined by the first and the second end positions, and with an addition of 60°. The additional 60° results from the field of view of the camera head providing an addition of 30° at the respective end positions. Further, by having three camera heads, as disclosed in FIGS. 1 and 2, the monitoring camera device may for example cover a 180° horizontal angle.

Other cameras of a plurality of camera heads may additionally have movement ranges between 15 and 75 degrees, or alternatively 0 to 90 degrees. By providing, for example three camera heads as shown in FIG. 1, at least a full half sphere space monitoring may be achieved. The field of views for the camera heads may be separated or overlapping. The images or sequences of images captured by the monitoring camera device may be stitched to form a single displayed image.

The relative motion of the shield 208 and the enclosure may be achieved by the shield 208 being pivotably mounted in the enclosure 202.

The first 302 and the second 304 shield portions may further be mutually movably arranged by means of a joint 318 providing a pivotable connection between the first 302 and second 304 shield portions. An efficient relative movement between the first 302 and the second 304 shield portions may thereby be achieved.

The first portion 302 and the second portion 304 of the shield 208 are in this embodiment pivotably connected by means of a joint 318 comprising a protruding element 320 of the first portion 302 which is arranged to extend into a corresponding opening fixture 322 of the second portion 304 of the shield 208. The protruding element 320 and the opening fixture 322 may provide rotational snap-in engagement.

The protruding element 320 may further extend beyond the opening fixture 322 such that the protruding element 320 may reach the enclosure 202. The shield 208 may thereby via the protruding element 320 be pivotably mounted in the enclosure 202. This allows the shield 208 to be movably arranged relative the enclosure 202.

The enclosure may in other embodiments comprise the protruding element and the shield may comprise the corresponding opening fixture. The skilled person in the art realizes that other types of arrangements may be used to achieve the relative movement of the first and the second portions of the shield and/or the relative motion of the shield relative to the enclosure.

The joint 318 comprises a pivot stop 324 defining a maximum pivot angle of the pivotable connection between the first 302 and second 304 shield portions. The joint 318 is shown in the detached enlargements of FIGS. 3a and 3b. The pivot stop 324 is provided on the second shield portion 304 and is arranged to allow for a maximum relative movement between the first 302 and second 304 shield portions. When the maximum relative movement has been reached, the pivot stop 324 is arranged for engagement with the first shield portion 302 such that continued movement of the shield portions 302, 304 will occur in a unison fashion. Thus, the pivotable connection allows the first shield portion 302 to be moved relative the second shield portion 304, but only to an extent defined by the pivot stop 324 and corresponding to the expanded state 308 of the shield 208. A gap between the first and the second shield may thereby be prevented.

The spring arrangement 316 is arranged to cooperate with the joint 318 upon movement of the shield 208. Upon movement of the aperture 310 of the shield 208 from the first end position 312 towards the second end position 314, the first shield portion 302 will be moved relative the second shield portion 304 causing an expansion of the shield 208. Once the shield has reached its extended state 308, continued movement of the first shield portion 302 will occur in unison with movement of the second shield portion 304. The movement of the second shield portion 304 will in turn make the abutment 317 engage the movable leg of the spring member 316 causing a biasing of the spring member 316. Consequently, once the aperture 310 has been positioned in the second end position 314, the spring member will be biased, and during a subsequent movement of the aperture 310 in the direction towards the first end position 312, the spring member 316 will initially act on the second shield portion 304 causing it to move in unison with the first shield portion 302. The unison movement of the first and second shield portions 302, 304 will continue until the second shield portion 304 has reached a position corresponding to the compressed state 306 of the shield 208, and continued movement of the first shield portion 302 will compress the shield 208 until it has reached its compressed state 306.

The joint 318 further comprises an additional pivot stop 325 defining a stop pivot angle of the pivotable connection between the first 302 and second 304 shield portions corresponding to the compressed state 306 of the shield 208 such that the first portion 302 of the shield 208 does not extend beyond the second 304 portion of the shield 208 in the compressed state 306. This prevents that the first portion 302 of the shield may extend into the interior of the arrangement such that it may come in contact with components within the interior of a monitoring camera device.

Referring to FIG. 3b, in this embodiment the arrangement 200 has a first shield portion 302 which comprises a recessed portion 326 such that a step 328 is formed. In this embodiment the recessed portion 326 has a thickness such that the combined thickness of recessed portion 326 and the second shield portion is substantially the same as the thickness of the first shield portion 302, i.e. where the first shield portion 302 does not comprise the recessed portion 326. The step 328 therefore provides an additional stop angle of the pivotable connection between the first 302 and second 304 shield portions in the compressed state 306 of the shield 208. A surface having a substantially uniform thickness is therefore provided as the first 302 and the second 304 shield portions overlap in the compressed state 306, see FIG. 3a. A more uniform outer surface 329 of the shield 208 is thereby achieved in the compressed state 306. The forces exerted on the additional pivot stop 325 in the compressed state 306 are further reduced by the step 328.

The second shield portion 304 has a cut out 330 as shown in FIG. 3b. The cut out 330 allows the shield 208, in its compressed state 306, to form a continuous outer envelope surface 331, see FIG. 3a. A common aperture is also defined by the cut out 330 and the aperture 310 of the first shield portion 302 of the shield 208. The overlap between the first 302 and the second 304 shield portions may thereby be made larger such that the shield 208 may be more compact in the compressed state 306.

The person skilled in the art realizes that the present invention by no means is limited to the preferred embodiments described above. On the contrary, many modifications and variations are possible within the scope of the appended claims.

For example, the camera head may be moved in a panning or tilting movement.

The first shield portion 302 may be arranged to move outside the second shield portion 304.

The enclosure 202 and the shield 208 may be transparent, although this would reduce the view-blocking effect.

The movement range of a camera head may be between 0 and 180 degrees. A larger space than a full half sphere space may thereby be monitored by the monitoring camera device.

The aperture and/or the opening may be shaped for example as an ellipse, a rectangle or a polygon, and may be adapted to an outer shape of each camera head.

Although only the opening 204 and the associated aperture 310 have been discussed in relation to FIGS. 3a and 3b, the function of the openings for the other two camera heads shown in FIG. 1 is the same.

It should, however, be noted that in other embodiments the arrangement may comprise more than three camera heads, each being movable within an associated movement range, wherein the enclosure further comprises openings for each of the plurality of camera heads such that free lines of sight are provided for each arbitrary camera head position of the associated camera heads within the movement range for each of the camera heads, and wherein the first shield portion of the shield comprises a plurality of apertures, each aperture being alignable with the free line of sight for each arbitrary camera head position of the associated camera heads.

According to other embodiments the arrangement may comprise one camera head.

The camera heads may be any type of camera heads, e.g., camera heads employing visible light, IR camera heads, or thermal camera heads.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

What is claimed is:

1. An arrangement for a monitoring camera device having a camera head being movable within a movement range ($MR_1$, $MR_2$), the arrangement comprising
    an enclosure for covering the interior of the monitoring camera device and having an opening for the camera head providing a free line of sight for an arbitrary camera head position within the movement range ($MR_1$, $MR_2$),
    a shield movably arranged relative the enclosure for masking parts of the opening not being used for providing the free line of sight for the arbitrary camera head position,
    the shield comprising a first and a second shield portion mutually movably arranged, wherein the shield is maneuverable between a compressed state and an extended state by movement of the first shield portion relative to the second shield portion,
    the first shield portion of the shield comprises an aperture being moveable in a range corresponding to the movement range ($MR_1$) of the camera head and defined by a first and a second end position by movement of the shield in order to align the aperture with the free line of sight for the arbitrary camera head position,
    the shield is maneuverable to the extended state during movement of the aperture from the first end position to the second end position, and
    a spring member arranged to cause a relative movement between the first and second shield portion during movement of the aperture from the first end position towards the second end position such that the shield assumes the extended state.

2. The arrangement according to claim 1, wherein the shield is maneuverable from the compressed state to or towards the extended state in response to an alignment of the aperture of the first shield portion of the shield with the free line of sight for the arbitrary camera head position.

3. The arrangement according to claim 1, wherein the spring member arranged to cause the relative movement between the first and second shield portion during an initial range part of the movement of the aperture from the first end position to the second end position such that the extended state of the shield is established before the aperture reaches the second end position.

4. The arrangement according to claim 1, wherein the range defined by the first and the second end position corresponds to a movement range ($MR_1$) of the camera head between 0 and 90 degrees, preferably between 15 and 75 degrees.

5. The arrangement according to claim 1, wherein the shield is pivotably mounted in the enclosure.

6. The arrangement according to the claim 1, wherein the shield and/or the enclosure is non-transparent.

7. The arrangement according to claim 1, wherein the first and the second shield portions overlap in the compressed state of the shield.

8. The arrangement according to claim 7, wherein the second shield portion comprises a cut out arranged such that the shield in its compressed state forms a continuous outer envelope surface and that a common aperture is defined by the cut out and the aperture of the first shield portion of the shield.

9. The arrangement according to claim 1, wherein the first and the second shield portions are mutually movably arranged by means of a joint providing a pivotable connection between the first and second shield portions.

10. The arrangement according to claim 9, wherein the joint comprises a pivot stop defining a maximum pivot angle of the pivotable connection between the first and second shield portions corresponding to the expanded state of the shield.

11. The arrangement according to claim 1, further comprising a plurality of camera heads each being movable within an associated movement range ($MR_1$, $MR_2$), wherein the enclosure further comprises openings for each of the plurality of camera heads such that free lines of sight are provided for each arbitrary camera head position of the associated camera heads within the movement range ($MR_1$, $MR_2$) for each of the camera heads, and wherein the first shield portion of the shield comprises a plurality of apertures, each aperture being alignable with the free line of sight for each arbitrary camera head position of the associated camera heads.

12. A monitoring camera device, comprising:
an enclosure for covering the interior of the monitoring camera device and having an opening for the camera head providing a free line of sight for an arbitrary camera head position within the movement range ($MR_1$, $MR_2$),
a shield movably arranged relative the enclosure for masking parts of the opening not being used for providing the free line of sight for the arbitrary camera head position,
the shield comprising a first and a second shield portion mutually movably arranged, wherein the shield is maneuverable between a compressed state and an extended state by movement of the first shield portion relative to the second shield portion,
the first shield portion of the shield comprises an aperture being moveable in a range corresponding to the movement range ($MR_1$) of the camera head and defined by a first and a second end position by movement of the shield in order to align the aperture with the free line of sight for the arbitrary camera head position,
the shield is maneuverable to the extended state during movement of the aperture from the first end position to the second end position, and
a spring member arranged to cause a relative movement between the first and second shield portion during movement of the aperture from the first end position towards the second end position such that the shield assumes the extended state.

13. The monitoring camera device according to claim 12, wherein the shield is maneuverable from the compressed state to or towards the extended state in response to an alignment of the aperture of the first shield portion of the shield with the free line of sight for the arbitrary camera head position.

14. The monitoring camera device according to claim 12, wherein the first and the second shield portions overlap in the compressed state of the shield.

* * * * *